Feb. 9, 1965   C. G. SOER   3,169,026
VEHICLE WHEEL SUSPENSION SYSTEM
Filed Nov. 14, 1962   2 Sheets-Sheet 1
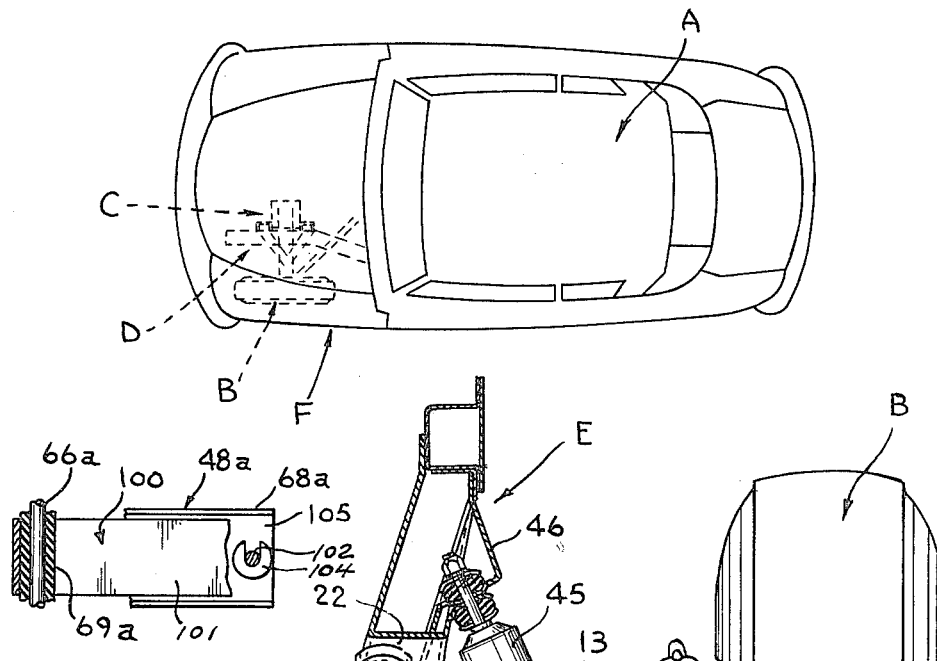
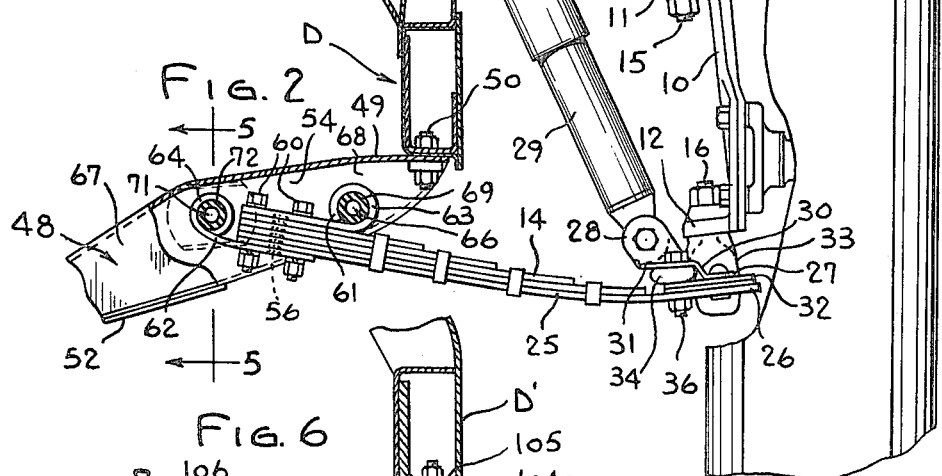
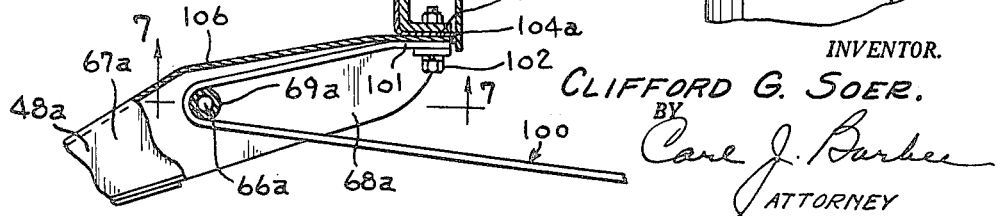
INVENTOR.
CLIFFORD G. SOER.
BY
Carl J. Barbee
ATTORNEY

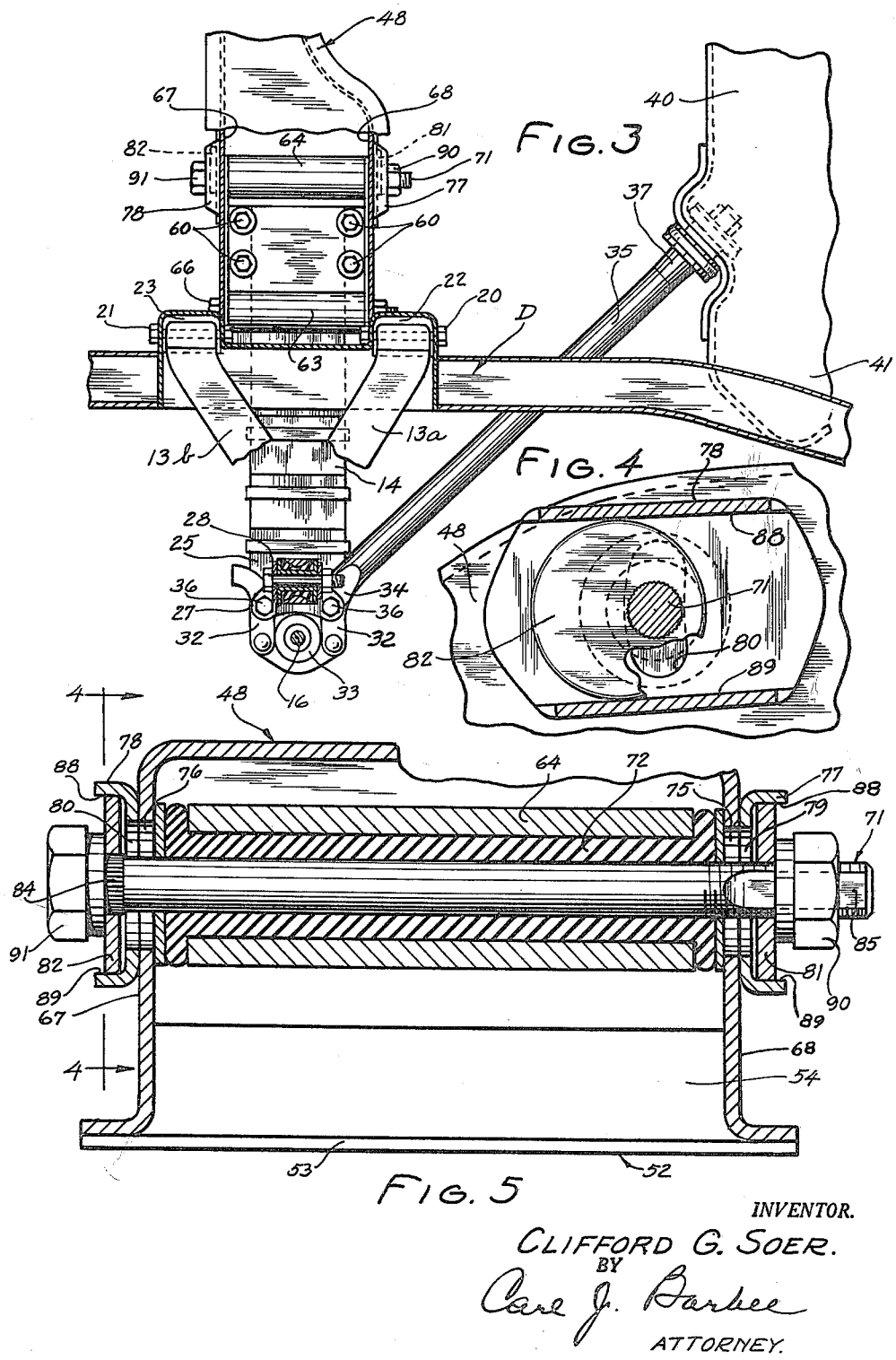

United States Patent Office 3,169,026
Patented Feb. 9, 1965

3,169,026
VEHICLE WHEEL SUSPENSION SYSTEM
Clifford G. Soer, Bristol, Wis., assignor to American Motors Corporation, Kenosha, Wis., a corporation of Maryland
Filed Nov. 14, 1962, Ser. No. 237,484
4 Claims. (Cl. 280—96.2)

The invention relates to a suspension system for suspending an automotive vehicle body relative to its wheels.

It will be understood that such suspension system is individually applicable to a single wheel of the vehicle and two systems would be necessary for the two front wheels of the vehicle. The drawings, however, are limited to the showing of one suspension system for one of the front wheels.

The general object of the invention is to provide an improved leaf type suspension system wherein the lower control arm also functions as a spring.

A specific object of the invention is to provide a leaf spring type lower control arm mounted with reference to the vehicle body for providing adjustment of the height of the body with reference to its wheels.

A further specific object of the invention is to provide in a leaf spring type of lower control arm similar leaves with integral eyes, one of which is mounted on a stationary pivot bolt while the other provides for adjustability of body height. Such adjustment, also functions to accommodate spring sag.

A further specific object of the invention is to provide in a leaf spring type lower control arm, a pivot bolt about which the leaf is partially wrapped and turned back for fastening to the vehicle body. Adjustment of body height or control of spring sag is accomplished at the location of fastening of the leaf to the vehicle body.

Other objects and advantages of the invention will be apparent from the ensuing specification and appended drawings in which:

FIGURE 1 is a plan view of an automotive vehicle showing the suspension system at one of the front wheels.

FIGURE 2 is a front view of the suspension system of FIGURE 1, shown partially in section.

FIGURE 3 is a plan view of the suspension system of FIGURE 2 and shown partially in section.

FIGURE 4 is a fragmentary sectional detail view taken on the line 4—4 of FIGURE 5.

FIGURE 5 is an enlarged fragmentary sectional detail view taken on the line 5—5 of FIGURE 2.

FIGURE 6 is a fragmentary sectional view similar to FIGURE 2 and showing a modified form of the invention.

FIGURE 7 is a fragmentary sectional detail view taken on the line 7—7 of FIGURE 6.

Referring to FIGURE 1, I have shown a plan view of an automotive vehicle A with a dotted line showing of the suspension system at one of the front wheels B. The suspension system, which is identified generally by the letter C is mounted on the vehicle body, a portion of which includes a longitudinal sill D which is integrally constructed as part of the vehicle body side wall, identified generally by the letter E (see FIGURE 2). The side wall E is situated inwardly of the vehicle when considering the front fender F which serves as a covering for the wheel. The fender is conjunction with the body side wall forms a pocket area for accommodating the wheel, the area being such as to permit the up and down movement of the vehicle body with reference to its wheels.

The wheel is secured to a steering knuckle 10 which has outwardly extending upper and lower flanges 11 and 12 for mounting the inner ends of the upper and lower control arms 13 and 14.

The wheel B is pivotally mounted on the bolts 15 and 16 with reference to the control arms for steering purposes. In the instant showing conventional ball joints (not shown) are utilized for the mounting of the control arms with reference to the steering knuckle.

The inner end of the upper control arm has diverging branches 13a and 13b which are pivotally mounted on bolts 20 and 21 within the pocket areas 22 and 23 of the body side wall.

The lower control arm is made up of multiple leaves including the lower leaf 25, the outer end 26 of which accommodates the mounting of the king pin thereto. A bracket 27 is anchored to the outer end of the leaf 25 and has an upwardly turned ear portion 28 to which is mounted the lower end of the shock absorber 29. The bracket 27 is bent upwardly at 30 and inwardly to provide a shelf portion 31 which is spaced from the flange 32 of the ball joint casting 33. The front end 34 of the brace rod 35 (see FIGURE 3) is secured by bolts 36 between the bracket shelf 31 and flange 32. The rearward end 37 of the brace rod is anchored to cross member 40 which extends crosswise of the vehicle body and is anchored at its opposite ends 41 (only one of which is shown) to the longitudinal sills D (only one of which is shown in FIGURE 3). The brace rod 35 thus in effect serves as a branch of the lower control arm for resisting twisting forces. The upper end 45 of the shock absorber is mounted in the protruding portion 46 of the body side wall.

Spaced from and forwardly of cross member 40 is a beam 48 which extends crosswise of the vehicle and is anchored at its opposite ends 49 (only one of which is shown) to the longitudinal sills D, as by means of fastening bolts 50. The beam 48 is of box shape in cross section, as best shown in FIGURE 5, and the floor 52 terminates at 53 to provide a pocket area 54 accommodating the inner end of the lower control arm assembly. The lower control arm, as has previously been pointed out, is made up of multiple leaves, the inner ends of which are provided with indentations 56 interlocking the leaves to prevent displacement with reference to each other. Bolts 60 anchor the assemblage of leaves together. Mounting members 61 and 62 may be of identical construction and are anchored to the remaining leaves as part of the spring assemblage, each being provided with an eye 63 and 64 for mounting the spring assemblage to the beam 48.

A bolt 66 projects through the opposite side walls 67 and 68 of the beam and extends through the eye 63. A rubber like sleeve 69 extends through the eye for insulating same from the beam. Bolt 71 also projects at its opposite ends through the side walls of the beam and passes through the eye 64. Rubber like sleeve 72 extends through the eye for insulating same from the beam.

The adjustment of vehicle body height relative to the wheels is accomplished by the mechanism disclosed most clearly in FIGURES 4 and 5. The side walls of the beam 48 are provided with the elongated slots 75 and 76 and the brackets 77 and 78 are likewise provided with elongated slots 79 and 80 which register with the respective beam side wall slots. Up and down adjustment of the bolt 71 within the limits of the slots is accomplished by means of cam washers 81 and 82 which are secured to the bolt 71 at opposite ends thereof. Washer 82 may be mechanically forced onto the serrated annular shoulder 84 for locking same to the bolt and washer 81 has a flat portion (not shown in the drawings) which cooperates with the flat 85 formed on the bolt 71 so that the washer is capable of limited axial movement relative to bolt 71 while being mounted non-rotatively relative thereto. The cam washers act against the inner faces 88 and 89 of the flanges which are formed on the brackets 77 and 78. The brackets are anchored to the side walls of the beam as being welded thereto.

Thus, if it is desired to raise the height of the vehicle body relative to the wheel B, nut 90 would be loosened slightly to permit rotation of the bolt by applying a wrench to the bolt head 91.

Viewing FIGURE 4, the bolt would be turned counter-clockwise thereby causing upward movement of the bolt within the elongated slots in the beam side walls and brackets. Upward movement of the bolt 71 causes a rotative movement of the lower control arm about the axis of bolt 66 in a clockwise manner (viewing FIGURE 2). The leverage obtained as a result of the greater distance between bolt 66 and the lower end of the steering knuckle as compared to the distance between bolt 66 and bolt 71 causes an excessive movement of wheel B relative to the body side wall E thereby effecting a corresponding upward movement of the vehicle. The nut would then be tightened to maintain the newly adjusted body height.

The same adjustment routine would be effected in order to correct "spring sag" (a sagging condition of the vehicle height relative to the wheel occasioned by extensive periods of usage of the vehicle).

Referring to the modified form of the invention as shown in FIGURE 6, a single leaf spring 100 is used (in place of the multiple leaf spring of FIGURE 2) and it is wrapped around the pivot bolt 66a and then turned back outwardly toward the wheel.

The end 101 of the leaf spring is anchored to the cross beam 48a and to the longitudinal sill D by means of the bolt 102. Bolt 66a would have its opposite ends projecting through the opposite side walls 67a and 68a and a rubber like sleeve 69a would be mounted on the bolt for insulating the spring from the cross beam. Height adjustment of the vehicle body relative to the wheel B is accomplished by inserting removable shims 104 at 104a (between the upper face of the leaf spring 105 of the upper wall 106 of the cross beam).

I claim:

1. Apparatus for suspending a vehicle body relative to its wheels comprising: a side wall forming part of the body and spaced from a wheel; a sill extending longitudinally of the body side wall and secure therewith; a beam extending transversely of the body side wall and being secured thereto; a wheel carrying steering knuckle; an upper non-resilient control arm pivotally mounted at its inner end to the body side wall and at its outer end to the upper end of the steering knuckle; a lower control arm in the form of a resilient leaf spring having its outer end secured to the steering knuckle, said spring having a first eye formed at its inner end and a second eye formed intermediate the outer end and the first eye; a bolt mounted on the beam and projecting through the second eye; a second bolt mounted on the beam and projecting through the first eye; means associated with the second bolt for adjusting the spring upwardly or downwardly relative to the beam about the axis of the first bolt, whereby to raise or lower the vehicle body relative to a wheel.

2. Apparatus as set forth in claim 1 wherein a brace is anchored at one end to the vehicle body and at its other end to the outer end of the spring.

3. Apparatus for suspending a vehicle body relative to its wheels comprising: a side wall forming part of the body and spaced from a wheel; a sill extending longitudinally of the body side wall and secure therewith; a beam extending transversely of the body side wall and being secured thereto; a wheel carrying steering knuckle; an upper non-resilient control arm pivotally mounted at its inner end to the body side wall and at its outer end to the upper end of the steering knuckle; a lower control arm in the form of a resilient leaf spring having its outer end secured to the steering knuckle, said spring having a first mounting portion formed at its inner end and a second mounting portion formed intermediate the outer end and the first mounting portion; a bolt mounted on the beam and projecting through the second mounting portion; a second bolt mounted on the beam and projecting through the first mounting portion; means associated with the second bolt for adjusting the spring upwardly or downwardly relative to the beam about the axis of the first bolt, whereby to raise or lower the vehicle body relative to a wheel and a brace anchored at one end to the vehicle body and at its other end to the outer end of the spring.

4. Apparatus for suspending a vehicle body relative to its wheels comprising: a side wall forming part of the body and spaced from a wheel; a sill extending longitudinally of the body side wall and secure therewith; a beam extending transversely of the body side wall and being secured thereto; a wheel carrying steering knuckle; an upper non-resilient control arm pivotally mounted at its inner end to the body side wall and at its outer end to the upper end of the steering knuckle; a lower control arm in the form of a resilient leaf spring having its outer end secured to the steering knuckle, said spring having a first mounting portion formed at its inner end and a second mounting portion formed intermediate the outer end and the first mounting portion; a bolt mounted on the beam and projecting through the second mounting portion; elastic means interposed between the bolt and the second mounting portion; a second bolt mounted on the beam and projecting through the first mounting portion; elastic means interposed between the second bolt and the first mounting portion; means associated with the second bolt for adjusting the spring upwardly or downwardly relative to the beam about the axis of the first bolt, whereby to raise or lower the vehicle body relative to a wheel and a brace anchored at one end to the vehicle body and at its other end to the outer end of the spring.

References Cited in the file of this patent

UNITED STATES PATENTS

| | | |
|---|---|---|
| 1,408,300 | Houdaille | Feb. 28, 1922 |
| 1,823,997 | Ranst | Sept. 22, 1931 |
| 1,919,670 | Roos | July 25, 1933 |
| 2,006,508 | Moir | July 2, 1935 |
| 2,123,089 | Leighton | July 5, 1938 |
| 2,157,773 | Probst | May 9, 1939 |
| 2,596,655 | Converse | May 13, 1952 |
| 2,876,018 | Kishline et al. | Mar. 3, 1959 |
| 3,034,802 | Axtmann | May 15, 1962 |
| 3,079,137 | Schilberg | Feb. 26, 1963 |